(12) United States Patent
Babej et al.

(10) Patent No.: US 9,249,823 B2
(45) Date of Patent: *Feb. 2, 2016

(54) SELF-PIERCING NUT ELEMENT AND COMPONENT ASSEMBLY CONSISTING OF THE NUT ELEMENT AND A SHEET METAL PART

(75) Inventors: Jiri Babej, Lich (DE); Christian Sowa, Offenbach (DE); Richard Humpert, Bad Nauheim (DE); Michael Vieth, Bad Vilbel (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 781 days.

This patent is subject to a terminal disclaimer.

(21) Appl. No.: 12/874,092

(22) Filed: Sep. 1, 2010

(65) Prior Publication Data
US 2011/0211932 A1    Sep. 1, 2011

(30) Foreign Application Priority Data

Sep. 2, 2009   (DE) .......................... 10 2009 039 817

(51) Int. Cl.
F16B 37/06    (2006.01)
(52) U.S. Cl.
CPC ................................... F16B 37/068 (2013.01)
(58) Field of Classification Search
USPC ........................ 411/179–181, 184, 187–188
See application file for complete search history.

(56) References Cited

U.S. PATENT DOCUMENTS

| | | | | |
|---|---|---|---|---|
| 1,332,687 | A | * | 3/1920 | Reynolds ...................... 220/304 |
| 3,213,914 | A | | 10/1965 | Baumle et al. |
| 3,252,831 | A | | 5/1966 | Ragan |
| 3,253,631 | A | | 5/1966 | Reusser |

(Continued)

FOREIGN PATENT DOCUMENTS

| | | |
|---|---|---|
| DE | 29 47 179 A1 | 5/1981 |
| DE | 10 2004 017 866 A1 | 11/2005 |

(Continued)

OTHER PUBLICATIONS

European Search Report in corresponding European Patent Application No. 10008806.1 dated Jan. 22, 2011.

(Continued)

*Primary Examiner* — Flemming Saether
(74) *Attorney, Agent, or Firm* — Hershkovitz & Associates, PLLC; Abraham Hershkovitz; Eugene Rzucidlo

(57) ABSTRACT

A piercing nut element having a strength in the range between 700 and 900 MPa which is designed to be pressed into the sheet metal part. The nut element is characterized in that the self-piercing attachment of the nut element into a sheet metal part of higher strength, or into a sheet metal part with a thickness greater than 3.5 mm, the nut element is designed in such a way that the piercing section has a peripheral extending groove below the sheet metal contact surface and in that the piercing section has a piercing edge at its free end face with the piercing edge being spaced from the boundary of the groove adjacent to the piercing section by a peripheral surface having an axial height which corresponds to at least 30% and preferably to at least 50% of the sheet metal thickness, wherein the radial wall thickness of the piercing section in the region of its free end face from the outer side of the piercing section up to the nominal diameter of the thread corresponds to a thickness between 1.2 to 1.8 and preferably 1.5 times the intended sheet metal thickness.

8 Claims, 11 Drawing Sheets

(56) References Cited

U.S. PATENT DOCUMENTS

| | | | |
|---|---|---|---|
| 3,736,969 A * | 6/1973 | Warn et al. | 411/179 |
| 3,775,791 A | 12/1973 | Grube | |
| 3,878,598 A * | 4/1975 | Steward | 29/432.2 |
| 6,220,804 B1 * | 4/2001 | Pamer et al. | 411/180 |
| 7,419,344 B2 * | 9/2008 | Ward et al. | 411/180 |
| 7,591,623 B2 * | 9/2009 | Parker | 411/180 |
| 7,597,515 B2 * | 10/2009 | Ward et al. | 411/180 |
| 7,677,074 B2 * | 3/2010 | Babej et al. | 72/404 |
| 8,092,131 B2 * | 1/2012 | Shuart et al. | 411/181 |
| 8,123,446 B2 * | 2/2012 | Babej et al. | 411/181 |
| 8,328,485 B2 * | 12/2012 | Babej et al. | 411/181 |
| 8,517,651 B2 | 8/2013 | Babej | |
| 2005/0265801 A1 * | 12/2005 | Ward et al. | 411/179 |
| 2006/0225267 A1 | 10/2006 | Wojciechowski et al. | |
| 2007/0258788 A1 | 11/2007 | Gardstam | |
| 2009/0196678 A1 * | 8/2009 | Babej et al. | 403/19 |

FOREIGN PATENT DOCUMENTS

| | | |
|---|---|---|
| DE | 20 2005 015 713 U1 | 1/2006 |
| DE | 10 2009 009 482 A1 | 9/2010 |
| EP | 755 749 B | 1/1997 |
| EP | 0 863 220 B2 | 8/2000 |
| EP | 1 609 561 A2 | 12/2005 |
| EP | 1 690 013 B1 | 8/2006 |
| EP | 1 892 427 A2 | 2/2008 |
| FR | 2 598 189 | 11/1987 |
| GB | A-934 101 | 8/1963 |
| WO | WO 94/01688 | 1/1994 |
| WO | WO2005/050034 | 6/2005 |
| WO | WO2007/121998 | 11/2007 |

OTHER PUBLICATIONS

English language translation of European Search Report in corresponding European Patent Application No. 10008806.1 dated Jan. 22, 2011.

European Search Report in corresponding European Patent Application No. 11 00 6297 dated Oct. 25, 2011.

English language translation of European Search Report in corresponding European Patent Application No. 11 00 6297 dated Oct. 25, 2011.

German Search Report mailed Feb. 18, 2014 in corresponding German Application No. 10 2009 039 817.1.

U.S. Final Office Action issued Dec. 19, 2013 in co-pending U.S. Appl. No. 13/192,969.

* cited by examiner

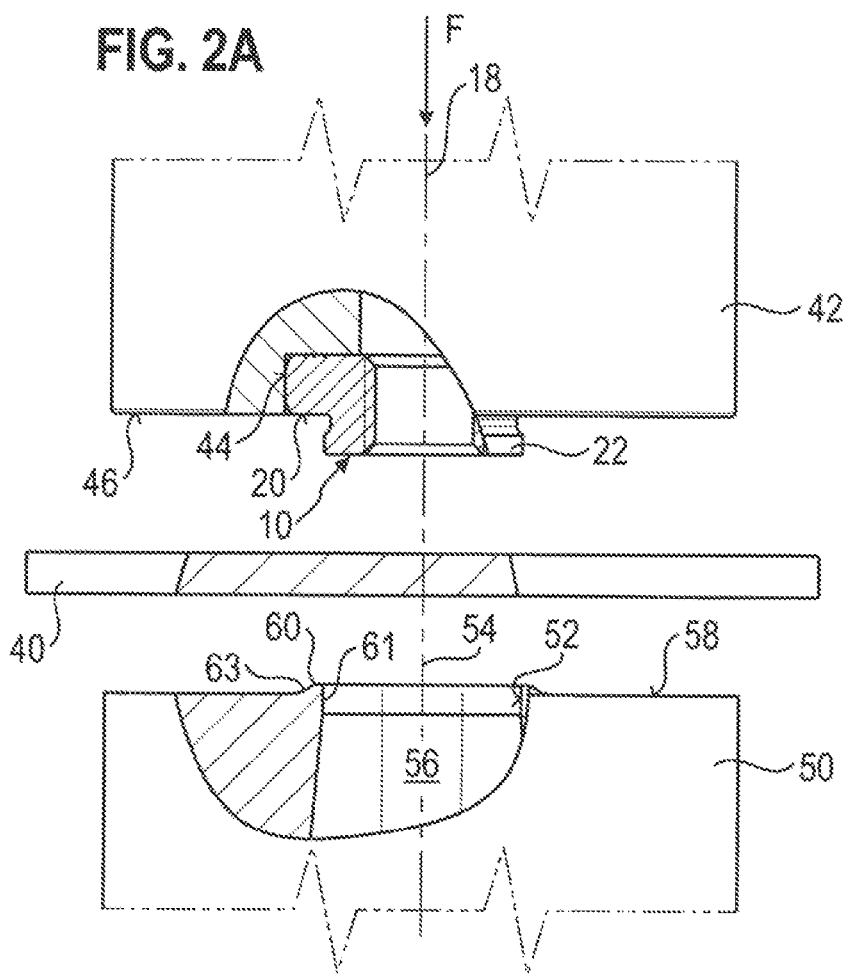
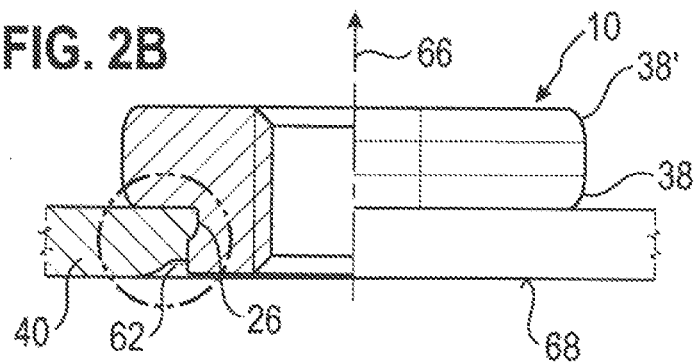
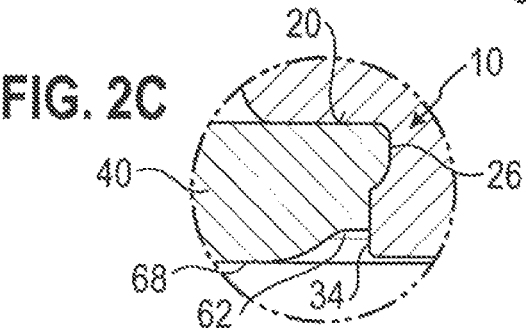

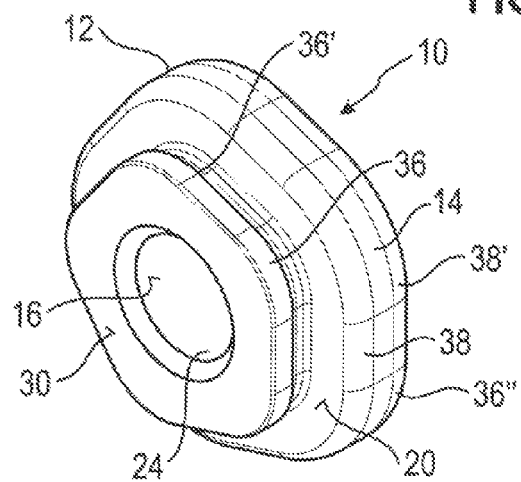
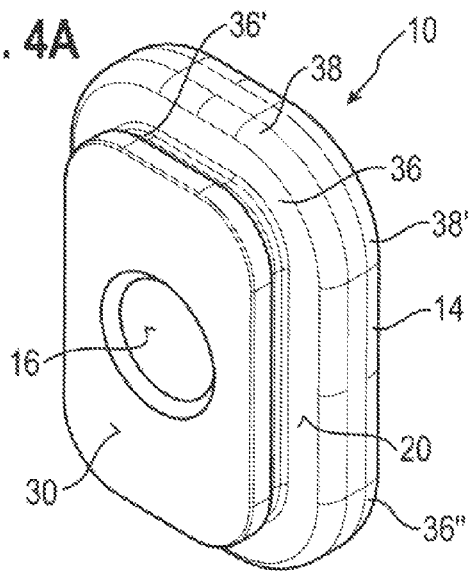
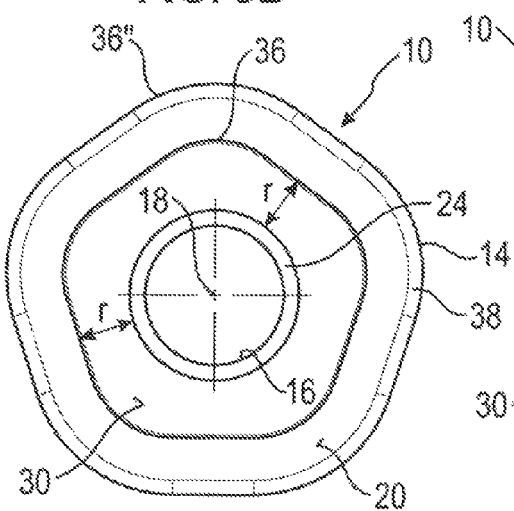
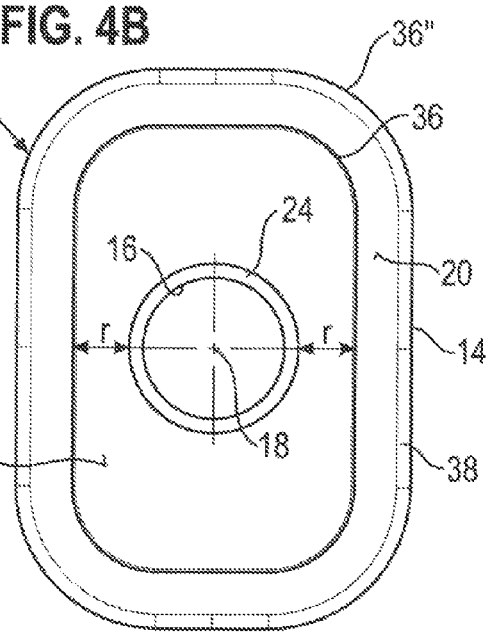
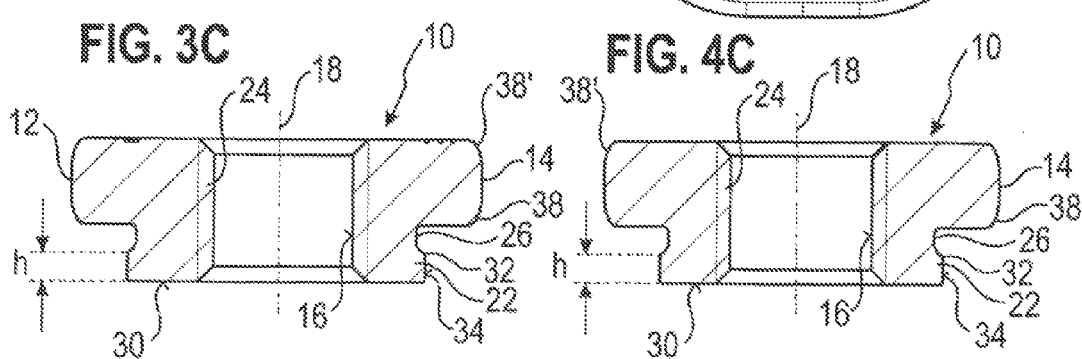

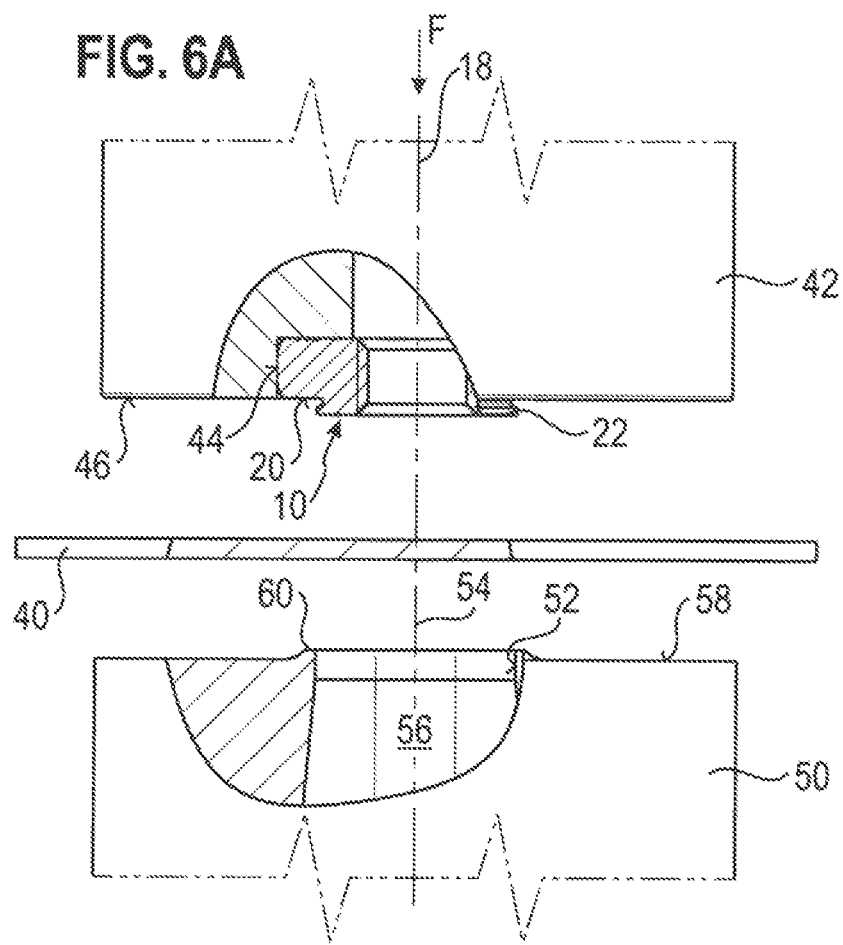
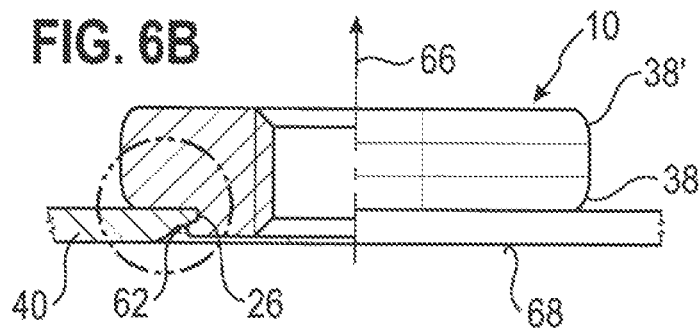
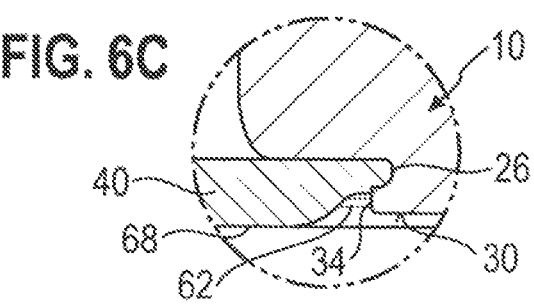

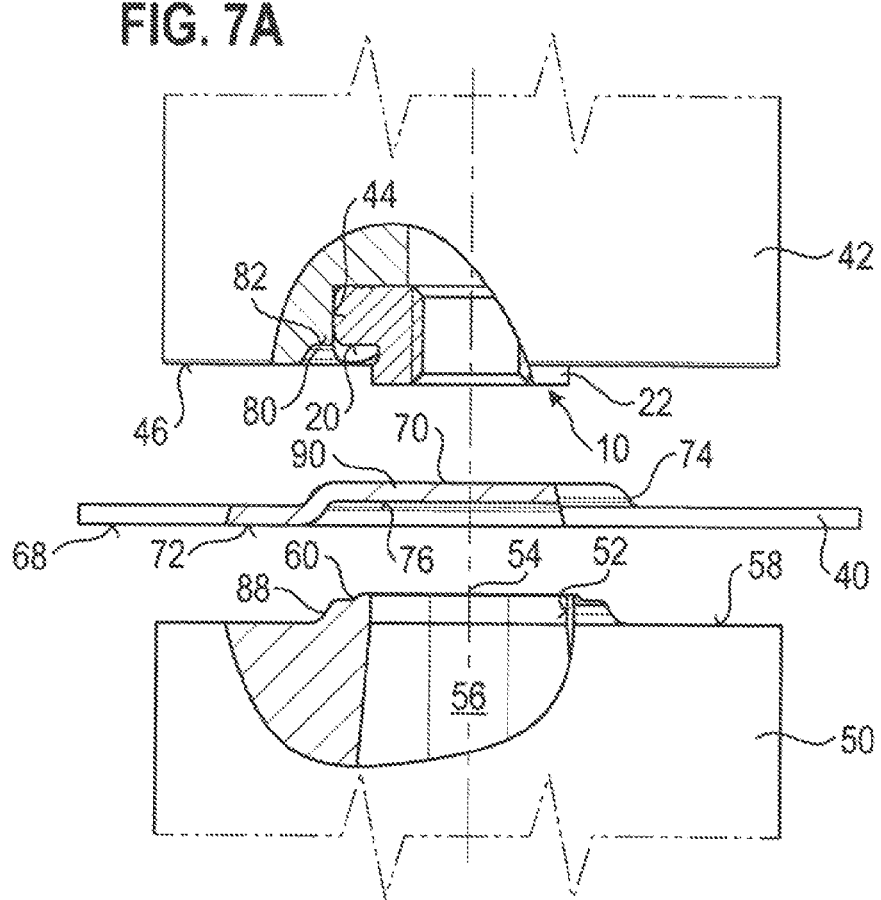
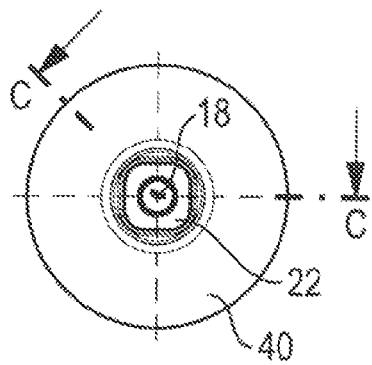
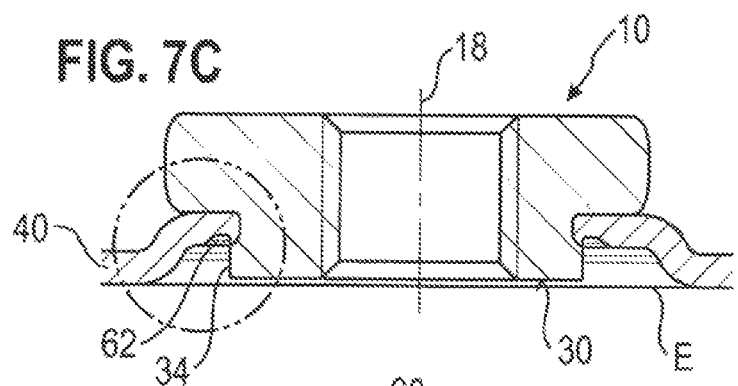
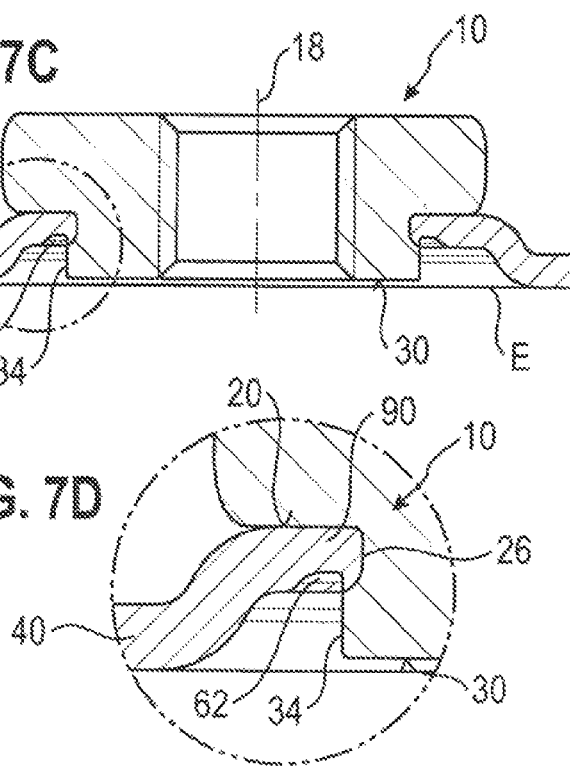

SELF-PIERCING NUT ELEMENT AND COMPONENT ASSEMBLY CONSISTING OF THE NUT ELEMENT AND A SHEET METAL PART

CROSS-REFERENCE TO RELATED APPLICATIONS

This application claims priority of German Patent Application No. 10 2009 039 817.1, filed Sep. 2, 2009, the disclosure of which is expressly incorporated by reference herein in its entirety.

FIELD OF THE INVENTION

The present invention relates to a self-piercing nut element having a strength in the range between 700 and 900 MPa which is designed to be pressed into a sheet metal part with the nut element having the following features: a head part forming a flange, a central bore in the head part which is designed to receive a bolt element and which has a central longitudinal axis, a sheet metal contact surface formed in a plane at least substantially perpendicular to the central longitudinal axis at the flange, as well as a piercing section extending away from the head part at the side of the sheet metal contact surface in the direction of the longitudinal axis. Furthermore, the present invention relates to a component assembly consisting of such a nut element which is attached to a sheet metal part.

BACKGROUND OF THE INVENTION

In the field of fastener elements which are attached during the manufacture of sheet metal parts to these by machines and distinguishes between pressing elements, on the one hand, and rivet elements, on the other hand. Pressing elements are characterized in that they are at least not intentionally be deformed on attachment to a sheet metal part but rather the sheet metal part itself is deformed and brought into engagement with features of shape of the pressing element, whereby the pressing element is attached in a manner secure against rotation and press-out at the sheet metal part. For rivet elements the element is intentionally deformed during attachment of the sheet metal part, mainly in order to form a rivet bead, whereby the sheet metal part is trapped between the rivet bead and a flange part in order to achieve a connection here which is also secured against rotation and press-out.

Furthermore, both pressing elements and also rivet elements are known as self-piercing elements. The designation self-piercing is to be understood such that the corresponding element pierces its own hole in the sheet metal part, naturally only when an adequate force is exerted on the self-piercing element, for example by a press or by a robot or by force-actuated tongs which press the self-piercing elements against the sheet metal part and which support the sheet metal part at the side remote from the element on a corresponding die button.

In vehicle construction it was hitherto customary to use self-piercing elements with sheet metal parts which have a strength below about 300 MPa. The self-piercing elements which are then used usually have a in addition strength in the range between 700 and 900 MPa and in exceptional cases of up to about 1250 MPa, which is entirely sufficient in order to pierce a hole in the sheet metal part on attaching the fastener element to the sheet metal part, in particular when the sheet metal part has a thickness of below about 3 mm. Strengths of the elements of up to about 850 MPa apply for example for elements of the class 8 whereas higher strengths apply for elements of the classes 10 and 12 which normally make a heat treatment and/or a specific material selection of the corresponding elements necessary.

With the fastener elements that are used, the material of the fastener element in the raw state normally has a strength of about 380 MPa. This strength is however increased to values in the range between 700 and 900 MPa solely by the cold deformation which is used in order to produce fastener element by cold deformation starting from the bar material.

For some purposes fastener elements are required which have a higher strength than 900 MPa. These are then manufactured from a material which can be hardened by a heat treatment, whereby a higher strength is achieved. However, such heat treatments are undesired in many cases. They represent a different process in comparison to manufacture of fastener elements with cold deformation and are normally not even carried out in the same factory in which the fastener elements are manufactured, whereby a considerable expenditure of time and money is required in order to produce heat treated elements of higher strength.

On the other hand, sheet metals with higher strength are increasingly been used in vehicle construction and partly also heat-treated sheet metal parts which have strength above the normal range of strength of 700 to 900 MPa for fastener elements. Such sheet metal parts of higher strength make it possible, on the one hand, to operate with thinner sheet metals, whereby weight can be saved, but, on the other hand, makes it extremely difficult to operate with self-piercing elements.

Sheet metal parts of higher strength are also required in vehicle construction which have larger thicknesses, since in some positions in the vehicle applications arise in which a thicker sheet metal part or a higher strength sheet metal part can be used to advantage.

Furthermore, interest exists currently in vehicle construction of operating at certain positions with sheet metal parts having a thickness larger than 3.5 mm, with the sheet metal parts then having strengths which lie in the above-named region of 300 MPa. An example for such applications is in the chassis area of trucks.

SUMMARY OF THE INVENTION

The present invention is based on the object of providing a self-piercing nut element which, with a strength in the range between 700 and 900 MPa, can be introduced in self-piercing manner into sheet metal parts of higher strengths or with thicknesses greater than 3.5 mm. Such nut elements in accordance with the invention are largely press-in elements. Furthermore, the nut element of the invention or the component assembly of the invention should be capable of being manufactured at relatively favorable cost.

In order to satisfy this object provision is made in a nut element of the initially named kind in that the self-piercing attachment of the nut element into a sheet metal part of higher strength, or into a sheet metal part with a thickness greater than 3.5 mm, the nut element is designed in such a way that the piercing section has a peripheral extending groove below the sheet metal contact surface and in that the piercing section has a piercing edge at its free end face, with the piercing edge being spaced from the boundary of the groove adjacent to the piercing section by a peripheral surface having an axial height which corresponds to at least 30% and preferably to at least 50% of the sheet metal thickness, wherein the radial wall thickness of the piercing section in the region of its free end face from the outer side of the piercing section up to the nominal diameter of the thread corresponds to a thickness between 1.2 to 1.8 and preferably 1.5 times the intended sheet metal thickness.

The corresponding component assembly existing of self-piercing nut element and the sheet metal part is characterized in that the sheet metal part has a pierced hole having a shape corresponding to the shape of the piercing section; in that the material of the sheet metal part at the side of the sheet metal part remote from the sheet metal contact surface has a recess adjacent to the piercing section and surrounding the piercing section and in that the material of the hole rim is displaced into the groove as a result of the formation of the recess.

It has namely been surprisingly found in accordance with the invention that with a suitable design of the piercing section in the sense that this is provided with an at least substantial cylindrical section with an axial height which corresponds to at least 50% of the sheet metal thickness and preferably more, is also able to punch a hole in the sheet metal part when the sheet metal part has a higher strength in the range of greater than 900 to over 1600 MPa and preferably of 1500 MPa or when the sheet metal part has a thickness greater than 3.5 mm.

The invention is however not only exhausted in the punching out of the corresponding punched hole, but rather the sheet metal part must be so secured to the nut element after the manufacture of the punched hole that the nut element contacts the sheet metal part in a manner secure against rotation and press-out.

For this purpose the preferably extending groove is provided in accordance with the invention at the piercing section beneath the sheet metal contact surface. It was found that even with higher strength or thicker sheet metals it is entirely possible to deform sheet metal material in the region of the hole rim by means of a die button with a corresponding ring nose such that a recess arises adjacent to the pierced section and the displaced sheet metal material of the hole rim is then urged into the peripheral extending groove. Thus, as a result of the displacement, a considerable hole friction initially arises which takes care of the security against rotation. Since the sheet metal material is deformed into the peripheral extending groove and this is framed, on the one side, by the sheet metal contact surface and, on the other side, by the region of the piercing section at the side of the sheet metal part remote from the sheet metal contact surface, a rather axial press-out resistance is effected.

If a higher security against rotation is desired, then this can be realized in different ways and means. One possibility consists in providing the sheet metal part and/or the functional element with an adhesive layer, for example an adhesive layer which cures at high pressures. Correspondingly high pressures arise during the attachment of the fastener element to the sheet metal part whereby the security against rotation can be achieved or favored.

Another possibility consists in making the piercing section or the groove polygonal in plan view with rounded corners at the transitions from one side of the polygon to the next. Through the polygonal shape of the piercing section or of the groove a high security against rotation is ensured.

The head part can also have a polygonal shape corresponding to the polygonal shape of the piercing section and also of the groove, likewise with rounded corners. The rounded corners are important because particularly with higher strength sheet metal parts the sharp edges which would otherwise arise at the transition from one side of the polygon to the next would lead to a considerable danger, which should not be underestimated, of fatigue cracks forming and of the connection which is aimed at with the nut element failing in operation. Through the rounded shape of the head part it is, moreover, ensured that no stress-increasing deformations of the sheet metal part occur at the radially outer side of the sheet metal contact surface, whereby the working life could be reduced.

In order to reasonably exploit this polygonal shape of the piercing section and of the groove or of the head part, it should be selected from the group consisting of square, rectangular, pentagonal or hexagonal.

In one embodiment in which the piercing section and the groove have a polygonal shape the possibility also exists of designing the head part in plan view so that the alignment of the head part about the longitudinal axis of the element can be ensured since with a polygonal shape of the piercing section or of the groove the piercing die must have a corresponding shape or a corresponding piercing opening and the element must then necessarily be aligned angle-wise with the die button. Such an alignment of the element can, for example, be achieved by two conical depressions in the side of the head part remote from the sheet metal part, with corresponding conical projections at the plunger of the setting head engaging into the conical depressions and serving for a corresponding positioning of the element. One or two grooves or ribs at the periphery of the head part could also be considered as an alignment aid.

However, the possibility also exists of designing the entire nut element such that the piercing section or the groove and the head part are at least substantially circularly round in plan view. Other measures must then be taken in order to ensure the security against rotation. For example, this can take place in that noses providing security against rotation are provided which either have the form of ribs extending in the axial direction at the piercing section which can be arranged at the cylindrical section and/or in the groove or which can have the shape of radially extending ribs within the groove which are substantially triangular in side view. These ribs providing security against rotation and noses providing security against rotation then lead to a corresponding deformation of the sheet metal part on the attachment of the nut element at the sheet metal part through which the security against rotation is ensured.

Furthermore, the possibility also exists in accordance with the European patent application 05 013 265.3 of producing features providing security against rotation in the sheet metal part before the nut element is secured to the sheet metal part whereby the required security against rotation can likewise be achieved.

At this point reference should be made to various documents relating to the prior art. The old US document U.S. Pat. No. 3,775,791 discloses fastener elements which are approximately square in plan view and which have grooves at two opposite sides which are intended to receive sheet metal materials. Elements shown in FIG. 12 of the named document are intended for self-piercing introduction into a sheet metal part. However, no hint can be taken from any of the named documents for the effect that such elements would also be suitable for the sheet metal part of higher strengths. In practice the opposite is the case since the sharp-edged embodiment in the region of the grooves leads to fatigue cracks in the sheet metal part and this is precisely the problem with higher strength sheet metal parts.

WO 94/01688 discloses in FIG. 17 a nut element having a head part between the flange and having a rivet section which is arranged beneath the sheet metal contact surface of a head part. The element is not intended as a self-piercing element and, in addition, it has no peripherally extending groove above a piercing section. The tapered shape of the rivet section admittedly forms a groove-like recess around the piercing section but this recess only extends in the axial direction of the head part further into the head part with the radially extending ribs at the sheet metal contact surface of the head part which ensure the security against rotation. Such ribs providing security against rotation are however not utilizable with sheet metal of higher strength because, as a result of the softer material of the head part, they are pressed flat on the attachment of the nut element to the sheet metal part. In other respects the recess then no longer corresponds to the peripherally extending groove at a piercing section beneath the sheet metal contact surface.

The element in accordance with U.S. Pat. No. 3,253,831 is admittedly formed as a self-piercing element, but here the corresponding groove is also not arranged beneath the sheet metal contact surface but this rather located axially within the head part of the element. The element of this US patent document is also not intended for the use with higher strength sheet metal parts or thicker sheet metal parts.

FR-A-2 598 189 is also concerned with a press-in element. However, the corresponding groove here is also arranged offset significantly within the head part of the element, with the region of the head part radially outside of the groove being pressed into the sheet metal part itself, whereby an undesired thinning of the sheet metal part arises. The element in accordance with the French document is also not intended as a self-piercing element and is also not suitable for use with higher strength sheet metal parts.

Finally, reference should be made to EP-B-1 690 013. This shows a self-piercing nut element which can be used with different sheet metal thicknesses. However, the nut element has a relatively complicated shape and is not suited, intended or designed for uses with higher strength sheet metal parts.

Preferred embodiments of the nut element and of the component assembly of the present invention can be seen from the subordinate claims and also from the following description of examples with reference to the accompanying drawings in which the following is shown, in each case to scale:

BRIEF DESCRIPTION OF THE FIGURES

FIGS. 3A-3C,

FIGS. 4A-4C,

DETAILED DESCRIPTION OF THE INVENTION

Figure 1A:
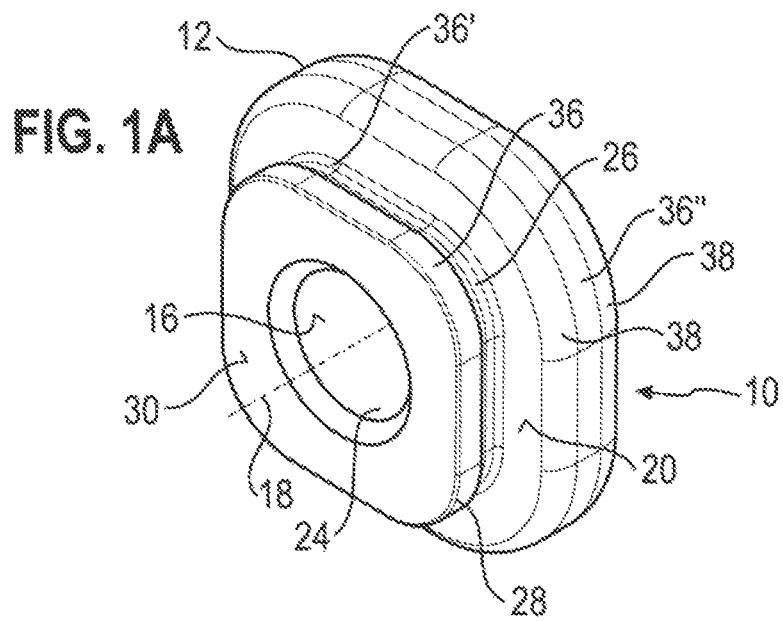
FIGS. 1A-1C representations of a first embodiment of a nut element in accordance with the invention in a perspective view (FIG. 1A), in an axial view of the left-hand side of the element in FIG. 1A (FIG. 1B) and in a side view of the element in accordance with the invention partly in axial half section (FIG. 1C), FIG. 2A the tools which are used to attach the nut elements of the invention in accordance with FIG. 1A to a sheet metal part, FIG. 2B a view corresponding to FIG. 1C but with the nut element secured to the sheet metal part, FIG. 2C an enlarged representation of the form-fitted connection between the nut element of the invention and the sheet metal part of FIG. 2B.
Figure 1B:
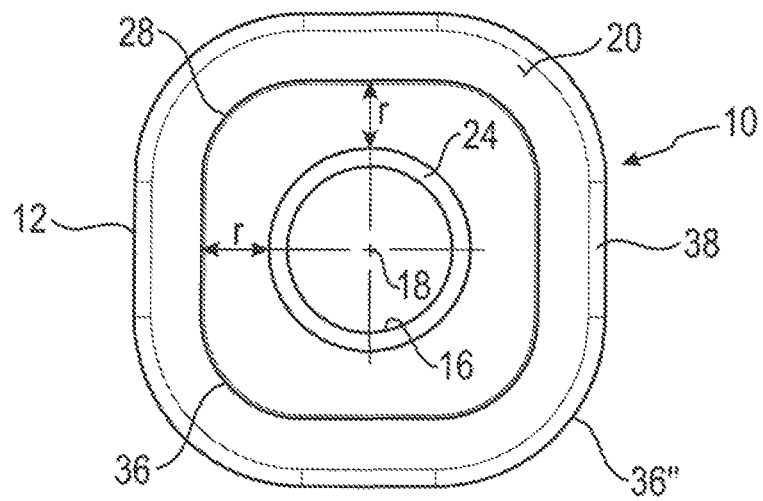
Figure 1C:
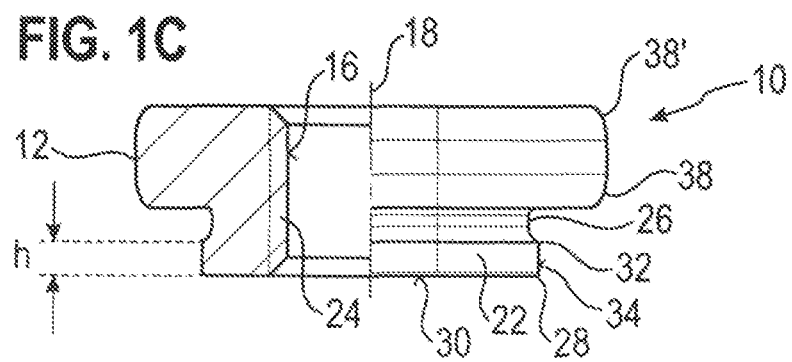

The FIGS. 1A to 1C show first of all a first embodiment of a self-piercing nut element 10 in accordance with the invention having a strength in the range between 700 and 900 MPa, in exceptional cases of up to 1250 MPa which is designed to be pressed into a sheet metal part, with the nut element having the following features:

A head part 14 forming a flange 12, a central bore 16 in the head part 14 which serves to accommodate a bolt element (not shown) and which has a central longitudinal axis 18, a sheet metal contact surface 20 formed in a plane standing at least substantially perpendicular to the central longitudinal axis 18 at the flange 12 and also a piercing section 22 extending away from the head part at the side of the sheet metal contact surface in the direction of the longitudinal axis. The bolt element can for example be a threaded bolt, whereby the nut element 10 is provided here with a thread cylinder 24, i.e. the bore 16 is a threaded bore. However, it could also be a bolt in the form of a bearing pin. In this case the thread cylinder is replaced with a smooth bore. The bore could however initially be executed as a smooth bore and be so dimensioned that a thread forming or thread cutting bolt can be used.

For the self-piercing attachment of the nut element 10 into a sheet metal part of higher strength or onto a sheet metal part with a thickness greater than 3.5 mm the nut element is designed such that the piercing section 22 has a peripheral extending groove 26 beneath the sheet metal contact surface 20, i.e. at the side of the sheet metal part adjacent the head part and that further has a piercing edge 28 at its free end face 30, with the piercing edge 28 being spaced from this adjacent boundary 32 of the groove 26 by a peripheral surface 34 having an axial height h which corresponds to at least 50% of the sheet metal thickness. The upper boundary of the groove 26 lies here, as in all further embodiments in accordance with the invention in the same plane as the sheet metal contact surface.

The self-piercing nut element of FIGS. 1A to 1C and also all further nut elements disclosed here corresponding to the present teaching are in particular for use with sheet metal parts having a strength in the range from greater than 900 to over 1600 MPa, preferably of about 1500 MPa. It is important that sufficient material is present behind the piercing edge, i.e. at the head part side of the piercing edge 28 in the region of the named peripheral surface 34. Furthermore, the piercing section should itself be designed, i.e. that a radial thickness and an axial height h such that no undesired deformation occurs under the punching-in forces. In practice that signifies that the axial height h and the radial thickness r of the piercing section should be dimensioned as follows:

The axial height of the named peripheral surface should correspond to at least 30% and preferably at least 50% of the sheet metal thickness, with axial heights of up to 100% of the sheet metal thickness and indeed beyond this being possible, if the element is not be attached to the sheet metal part within a recess. It is important as a rule that the free end face does not project beyond the side of the sheet metal part remote from the head part with the free end face normally being set back by about 0.02 mm relative to the named side of the sheet metal part. In this way a further component can be directly screwed onto the sheet metal part and a desired direct clamping of the component with the sheet metal part is achieved. This signifies, however, that the axial height of the piercing section, i.e. the peripheral surface together with the groove, may not be greater than 100% of the sheet metal part thickness, unless the nut element is attached to the sheet metal part within a recess. In this case the selection of the axial depth of the recess always enables an arrangement in which the free end face of the piercing section of the nut element is always set back from the plane of the side of the sheet metal part outside of the recess remote from the head part of the nut element and indeed independently of the respective sheet metal part thickness.

The radial wall thickness r of the piercing section in the region of its free end face from the outer side up to the nominal diameter of the thread (i.e. the outer diameter of the thread, i.e. when M8 tread with a diameter of 8 mm and a radius of 4 mm) lies in the range between 1.2 and 1.8 times and preferably between 1.3 and 1.7 times and in particular by approximately 1.5 times of the intended sheet metal part thickness.

If the radial wall thickness r is selected to be too small, the danger exists of undesired deformation of the piercing section, in particular with unfavorable circumstances resulting from tolerances. If, in contrast, it is selected to be too large, then the nut element becomes unnecessarily heavy. The value of 1.5 times the sheet metal part thickness has proved to be favorable.

With non-square or circular piercing sections the dimension r is to be understood as the smallest radial wall thickness, as is drawn in the Figure, then being possible to select the dimension r to be also somewhat smaller than 1.5 times the sheet metal part thickness, for example 1.2 times the sheet metal part thickness.

FIG. 2A shows schematically the tools which are used in order to punch nut elements in accordance with FIGS. 1A to 1C of comparable elements into a sheet metal part 40. The tool consists of a setting head 42 which is provided with a recess 44 which is adapted to the head shape of the nut element 10 so that the piercing section 22 projects from the lower end face 46 of the setting head 42. The sheet metal contact surface 20 of the nut element 10 lies in the same plane as the end face 46.

Setting heads of this kind are well known and are normally designed for the automatic feeding of nut elements from a supply into the mount 44. Examples for such setting heads are amongst other things contained in the European patent specification EP-755 749 B2 of the present applicant. Furthermore, the setting head could for example be used such as is described in GB-A-934101.

Beneath the sheet metal part 40 there is located a die button 50 with a central opening 52, the cross-sectional shape of which corresponds to that of the piercing section 22, with the die button opening 52 being made slightly larger than the piercing section 22 so that the latter can fit into the opening 52 with a small clearance. For example, the opening 52 could be approximately 0.01 mm larger in comparison to the piercing section 22. The opening 52 has a central longitudinal axis 54 which is aligned with the central longitudinal axis 18 of the nut element 10.

Since the opening 52 of the die button is intended to accommodate the piercing section 22 at least in the region of its end face, the die button must be aligned in the corresponding tool of the press in accordance with the alignment of the nut 10 in the setting head.

Furthermore, it should be mentioned that the passage 56 beneath the opening 52 diverges away from this so that the piercing slug which arises when the nut element 10 is pressed by a force acting in the direction of the arrow F against the sheet metal part and against the die button, whereby a piercing slug is cut out from the sheet metal part by means of the cooperation between the piercing section 22 and the die button 50 and is finally disposed of via the diverging passage 56. In this figure a so-called hold-down member (not shown) can be integrated in the setting head 42. This hold-down member has the task of pressing the sheet metal part 40 firmly against the end face 58 of the die button or against the tool receiving the die button 50 prior to the punching through of the sheet metal part 40.

Normally the die button 50 is accommodated in the lower tool of a press and indeed such that the upper end face in FIG. 2A lies flush with the surface of the lower tool. The setting head 42 is then either installed on an intermediate plate of the press or on the upper tool of the press. It is equally possible to accommodate the die button 50 in the intermediate plate of the press and to then arrange the setting head 42 in the upper tool of the press. Furthermore, inverse arrangements are also possible in which the die button 50 is arranged above the setting head 42, for example such that the setting head 42 is arranged facing upwardly in the lower tool of the press or in the intermediate plate of the press, the die button then consequentially will be arranged in the inverse position relative to FIG. 2A in the intermediate plate of the press or in the upper tool of the press.

Finally, it is not necessary to use a press to punch or stamp-in the nut element 10 but rather this function could be taken on by a robot equipped with corresponding tools by force-actuated tongues.

Around the opening 52 of the die button there is a nose 60 which in plan view has a square shape with rounded corners corresponding to the peripheral line of the piercing section 22. The nose 60 has a vertical flank 61 which surrounds the opening 52 and an oblique flank 63.

On closing of the press or of the tool in accordance with FIG. 2A, the piercing section 22 pierces a piercing slug from the sheet metal part 40 which then drops through the passage 56 of the die button and can be removed from the press. The punching through of the sheet metal part takes place as a result of shear forces which arise between the piercing edge 28 of the piercing section 22 and the boundary of the opening 52 at the upper side of the die button.

During the punching through of the sheet metal part, the ring nose 60 also presses directly against the underside of the sheet metal part and forms there a recess 62 which extends around the piercing section 22 in the region of its end face edge. The material which arises during the formation of the recess 62 is forced as a result of the considerable compression ring press, to flow into the groove 26 whereby the sheet metal part 40 is connected in form-fitted manner to the nut element 10. The nut element 10 is namely secured against rotation about the axis 18 in the sheet metal part because here the square form of the piercing section 22, which is arranged in a punched-out opening in the sheet metal part 40 of matched shape, prevents a mutual rotation of the sheet metal part and of the nut element. Through the material which is located in the groove 26 not only is a high hole friction produced between the sheet metal part and the nut element which also contributes the security against rotation but rather a form-fitted connection is also produced such that the pressing out of the nut element out of the sheet metal part 40 in the pressing out direction 66 is not possible or is only possible with the application of considerably destroying forces. The danger that the nut element 10 is pressed downwardly into the opposite direction (opposite to the direction of travel 66) is not present because the sheet metal contact surface 20 sits over its full area on the surface of the sheet metal part 40 and prevents this.

The overlap in the region of the groove of the piercing section is shown to a larger scale in FIG. 2C. In operation a further component is attached to the lower side of the sheet metal part 40 in FIG. 2A and indeed by means of a threaded bolt, the thread of which is screwed into the thread 24 coming from below in FIG. 2B. One sees from the drawings of the FIGS. 2B and 2C that the lower end face 30 of the piercing section 22 is slightly set back relative to the underside 68 of the sheet metal part. This signifies that in the bolted up situation, i.e. when a further component is secured by means of the above-named threaded bolt to the sheet metal part 40, the end face 30 of the nut element is so positioned that the sheet metal part 40 and the further component lie areally against one another, at least in the region of the nut element 10, and are clamped again one another in the sense of a high quality bolted connection.

The self-piercing nut element in accordance with the present teaching is preferably so designed that the piercing section or the groove are polygonal in plan view with rounded edges 36 and 36' at the transition from one side of the polygonal to the next. In the example of FIGS. 1A to 1C the polygonal form is square. In the nut element in accordance with FIGS. 3A to 3C it is pentagonal. In FIG. 4A to 4C it is rectangular with two different side lengths. Otherwise, the description of FIGS. 1A to 1C also applies to FIGS. 3A to 3C and 4A to 4C which is why the same reference numerals are also used there and the previous description also arise for these embodiments. One notes also in all these embodiments that the head part 14 in plan view also has a polygonal form corresponding to the polygonal form of the piercing section 22 and the groove 26, likewise with rounded corners 36". The transitions 38, 38' from the sheet metal contact surface 20 into the side wall of the head part, i.e. from the side wall of the head part 14 into the end face 39 of the nut element remote from the piercing section, are preferably rounded, a shape which can straightforwardly be produced to the manufacture of the nut elements by cold heading, with the rounded edges 38 particularly contributing to the fact that no fatigue cracks arise at the surface of the sheet metal part adjacent to the head part 14.

Figure 5A:
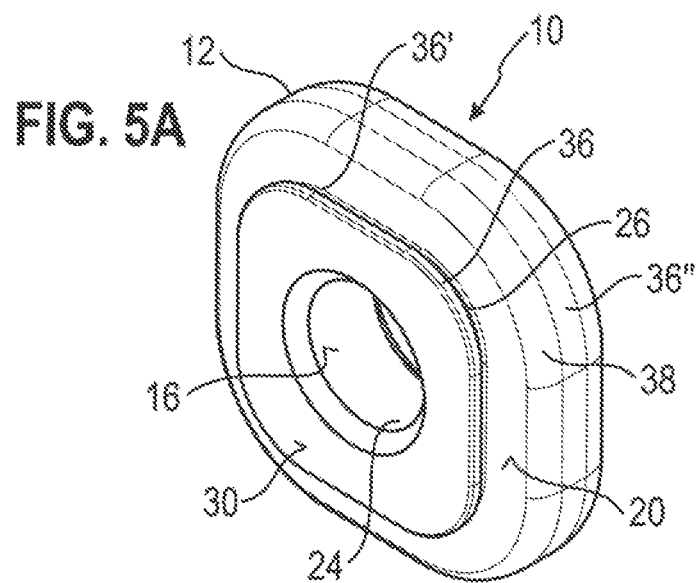
FIGS. 5A-5C representations corresponding to FIGS. 1A-1C but of different nut elements in accordance with the invention, FIG. 6A a representation corresponding to FIG. 2A but of tools which are used when the nut element in accordance with the invention is attached to a relatively thin sheet metal part, FIGS. 6B, 6C representations corresponding to FIGS. 2B and 2C but for the component assembly consisting of a relatively thin sheet metal part and an element in accordance with the invention, FIG. 7A modified tools which can be used, FIG. 7B a plan view of the component assembly produced using the tool of FIG. 7A showing the section plane C-C, FIG. 7C the section drawing corresponding to the section plane C-C in FIG. 7B, FIG. 7D an enlarged representation of the encircled region of the representation in accordance with FIG. 7C, FIG. 8A, 8B a perspective representation of the component assembly which results when the nut elements in FIGS. 1A-1C are attached to a relatively thick sheet metal part and indeed from above in FIG. 8A and from below in FIG. 8B, FIGS. 9A, 9B representations corresponding to FIGS. 8A and 8B but with a relatively thin sheet metal part, FIGS. 10A, 10B drawings corresponding to FIGS. 8A, 8B, but with the arrangement of a nut element in accordance with FIGS. 1A-1C in or on a recess in the sheet metal part, FIGS. 11A, 11B representations corresponding to FIGS. 2B and 2C but when using a nut element with ribs providing security against rotation in the groove and also at the peripheral surface of the piercing section beneath the groove, FIGS. 12A-12C representations corresponding to FIGS. 1A-1C but of a nut element in accordance with the invention with ribs providing security against rotation which extend axially along the piercing section and indeed at the peripheral surface and in the groove, and FIGS. 13A-13C representations corresponding to FIGS. 12A-12C but with a different arrangement of the ribs providing security against rotation.
Figure 5B:
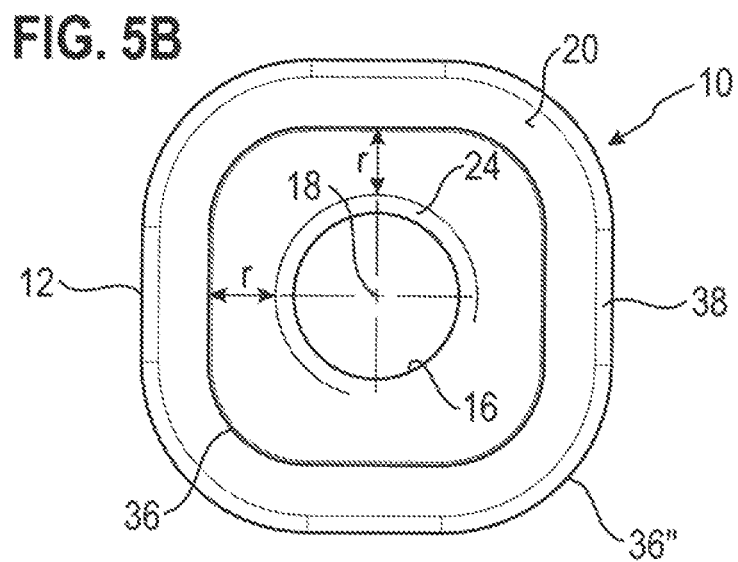
Figure 5C:
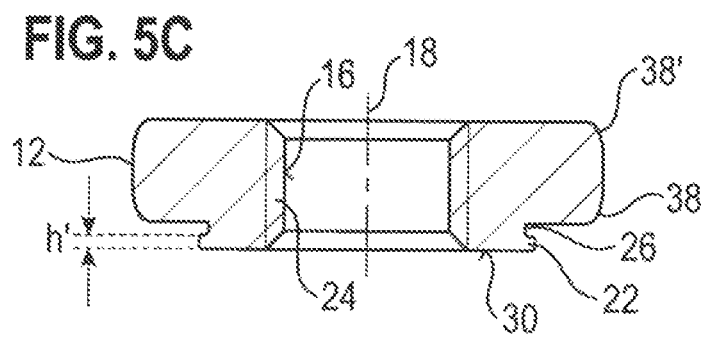

One can see from a comparison of FIGS. 1A to 1C, FIGS. 3A to 3C and FIGS. 4A to 4C that the axial height of the piercing section or of the named peripheral surface 34 is matched to the respective sheet metal part thickness. Whereas the nut elements in accordance with the FIGS. 1A to 1C, FIGS. 3A to 3C and FIGS. 4A to 4C are designed for rather thicker high strength sheet metal parts of 2.0 mm thickness, FIGS. 5A to 5C show a nut element 10 similar to that of FIGS. 1A to 1C which is, however, designed for thinner high strength sheet metal parts, for example for those with sheet metal part thickness of 0.5 mm. In distinction to the nut element in accordance with FIGS. 1A to 1C it is in principle only the axial height h' of the named peripheral surface of the piercing section 22 and also the axial height of the groove 26 which are both executed in the adaptation to the sheet metal part. The FIGS. 5A to 5C have the same reference numerals as the FIGS. 1A to 1C and the previous description applies equally for the corresponding features. The nut element 10 in accordance with FIGS. 5A to 5C is introduced into the sheet metal part 40 in accordance with FIG. 6A by means of the tools shown there which are designed precisely in the same way as the tools of FIGS. 2A to 2C which is why the same reference numerals are used here, with the previous description applying exactly in the same way for the corresponding features.

The single important distinction between the embodiment of FIGS. 2A to 2C and FIGS. 6A to 6C lies in the fact that the peripheral extending nose 60 of the die button by way of matching to the smaller height of the piercing section likewise has a smaller height. The finished component assembly in accordance with FIGS. 6B and 6C is designed in precisely the same way as the finished component assembly in accordance with FIGS. 2B and 2C, i.e. the end face 30 of the piercing section 22 stands slightly behind the side 68 of the sheet metal part 40 remote from the sheet metal contact surface 20 in order to comply with the attachment situation as previously described.

The FIGS. 7A to 7D show a further possibility for the attachment of the nut element into a sheet metal part 40, here a sheet metal part of medium thickness, however, this embodiment can be used for all sheet metal thicknesses which come into consideration, for example from about 0.5 to 2.0 mm for high strength sheet metal parts or up to 3.5 mm and beyond for thick sheet metal parts of normal strength. In this example the sheet metal part is provided with a recess 70, with the side 72 of the sheet metal part 40 remote from the sheet metal contact surface 20 lying directly outside of the recess 70 in a plane E and the free end face 30 of the piercing section 22 lying within the recess 70 before the side 76 of the sheet metal part remote from the sheet metal contact surface 20 and projecting within the recess 70 but being set back from the named plane E.

In order to enable this embodiment, tools similar to those of FIGS. 2A to 2C or 6A to 6C can be used but with certain modifications which will now be explained in more detail.

In conjunction with the FIGS. 7A-7D the same reference numerals are used for features or parts as previously which have the same design or function. Only the different parts or features will be especially described. It will be understood that the previous description applies for parts and/or for features which are identified with the same reference numeral in just the same way for this embodiment.

First of all it is evident from FIG. 7A that the nut element 10 is now arranged somewhat further to the setting head 42 and that the lower side of the setting head around the functional element has a recess 80 matched to the shape of the recess 70. The base surface 82 of the recess is now aligned with the sheet metal contact surface 20 of the nut element 10. The sheet metal part 40 with the recess 70 is arranged between the setting head 42 and the die button 50 and one can see from FIG. 7A that the recess 70 has been previously manufactured in an earlier processing step. This is, however, not compulsorily necessary as will be explained in the following.

In any event the recess 80 in the lower end of the setting head is so designed that it corresponds to the outer contour 74 of the recess 70, i.e. to the shape above the sheet metal part 40 in FIG. 7A

The recess 70 in the sheet metal part 40 also makes it necessary that the die button be modified and indeed in such a way that the peripheral nose 60 is now located on a ring step 88 which is matched to the inner shape of the recess in accordance with FIG. 7A. In this embodiment the punching through of the sheet metal part 40 takes place in the region of the base 90 of the recess and indeed precisely as previously described.

The component assembly situation can be found in FIGS. 7C to 7D with the sectional drawing in accordance with FIG. 7C being taken in accordance with the section line C-C of FIG. 7B. As a result of this section plane, which is taken at the left side of FIG. 7B through the rounded corner of the piercing section, the nut element 10 has a larger radial dimension to the left of the central axis 18 of FIG. 7C than to the right side of FIG. 7C where the section plane is taken through the center of a straight side of the piercing section 22 which is square in plan view.

One can see from FIG. 7C that here the sheet metal part 40 completely fills the recess of the groove 26 and that the ring-like groove 62 in the sheet metal part is arranged in the lower region of the base part 90 of the recess 70. One can also see from FIGS. 7C to 7D that in this embodiment the peripheral surface 34 of the piercing section 22 is executed with axial height which is indeed fractionally larger than that of the sheet metal thickness. This ensures that the piercing section 22 as adequately stable in order to punch through the sheet metal part 40. Since the groove 26 receives the sheet metal part here the peripheral surface 34 of the piercing section 22 lies below the side 76 of the base region 90 of the sheet metal part 40 remote from the sheet metal contact surface of the element but still within the recess 70. Thus, the desired bolted up situation is ensured when bolting a further component to the lower side of the sheet metal part in FIGS. 7C and 7D since the sheet metal part 40 and the further component lie areally against one another outside of the recess. On tightening the threaded bolt, the nut element 10 is drawn against the further component in the sense of a pre-stressing of the sheet metal material of the recess 70 so that the further component also press against the end face 30 of the piercing section 22. It should be pointed out that the amount by which the end face 30 is set back from the plane of the sheet metal part outside of the recess (the lower side of the sheet metal part outside of the recess) is relatively small in practice and normally dimensioned to be between 0 and 0.02 mm. Although FIGS. 7A to 7D show the use of a sheet metal part 40 with a pre-manufactured recess 70 this is not compulsorily necessary. One can operate in just the same way with a flat sheet metal part 40 with the recess then being simultaneously manufactured with the punching in of the nut element 10.

Figure 8A:
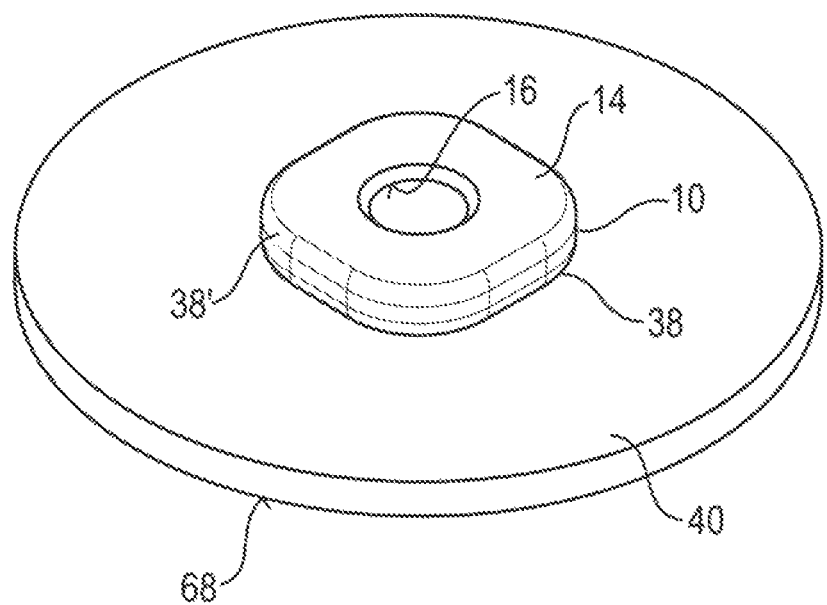
Figure 8B:
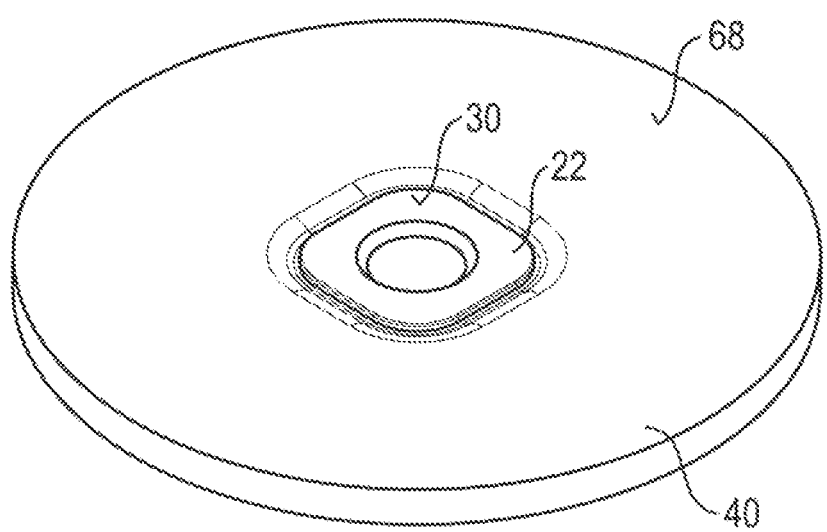

The FIGS. 8A and 8B show in a perspective illustration the situation which exists when the nut element 10 is introduced into a sheet metal part without a recess. From FIG. 8A one can see that the head part 14 of the nut element 10 lies in the surface of the sheet metal part 40 but does not project into this surface. FIG. 8B shows the sheet metal part in accordance with FIG. 8A from below. Here it is evident that the end face 30 of the nut element does not project beyond the side of the sheet metal part which is remote from the sheet metal contact surface 20 of the nut element 10.

Figure 9A:
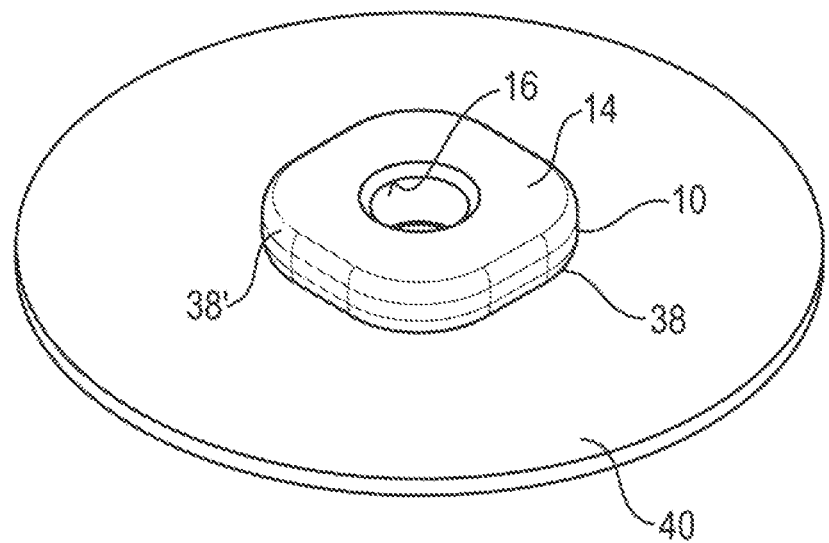
Figure 9B:
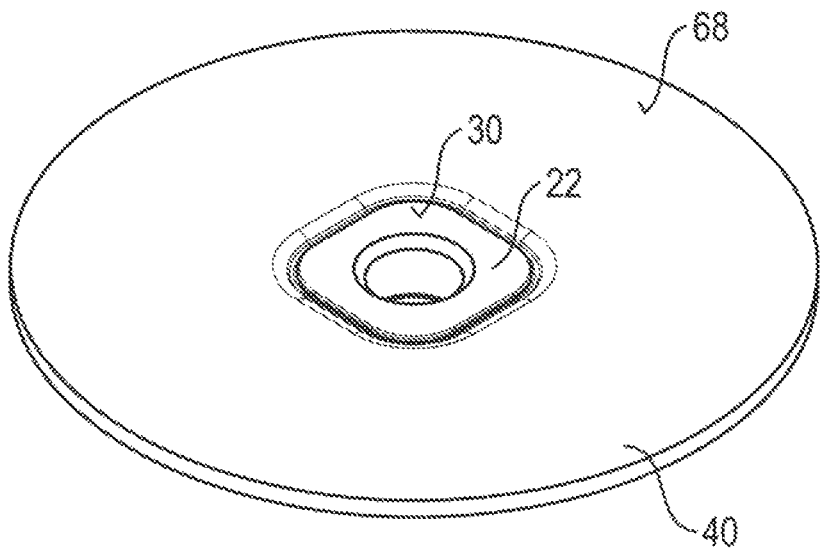

The FIGS. 9A and 9B show the same situation but here with a thinner sheet metal part while using the nut element 10 in accordance with FIGS. 5A to 5C. There the sheet metal contact surface 20 of the head part 14 of the nut element lies on the surface of the sheet metal part in FIG. 9A without the head part being arranged offset in the sheet metal part 40. In FIG. 9B it is also evident that the end face 30 of the nut element 10 does not project beyond the corresponding side of the sheet metal part.

Figure 10A:
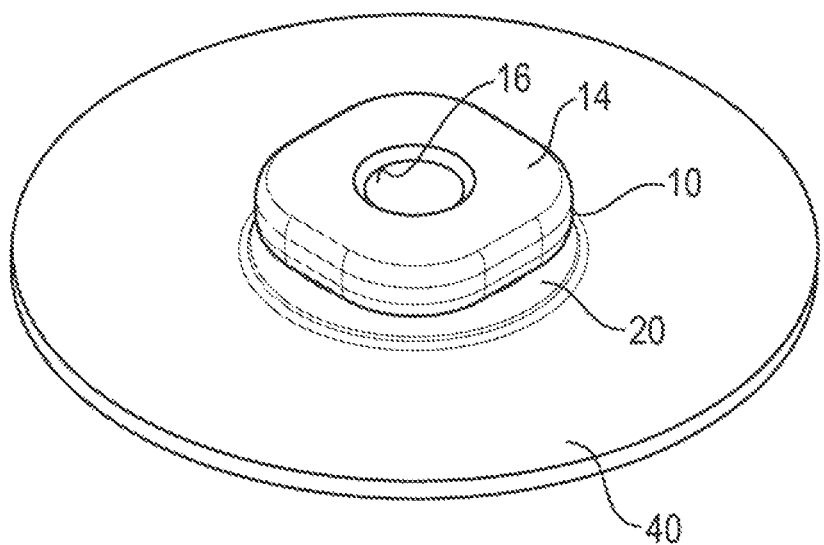
Figure 10B:
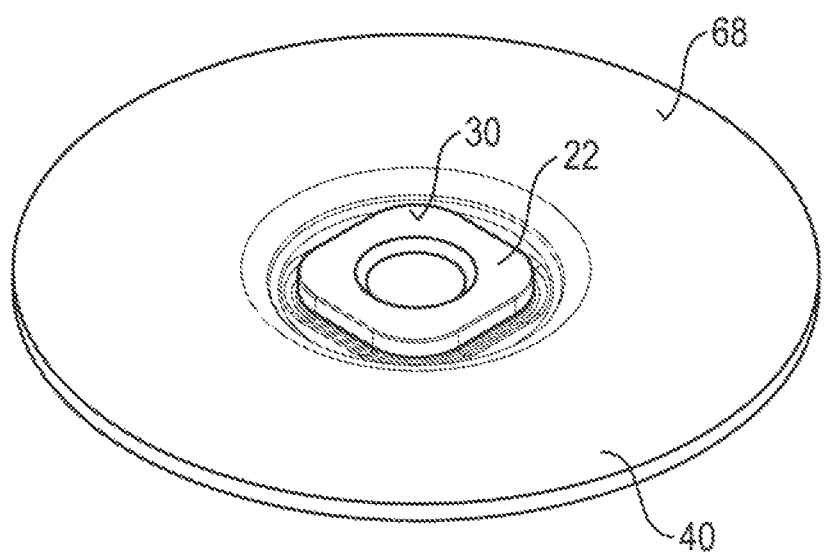
Figure 12A:
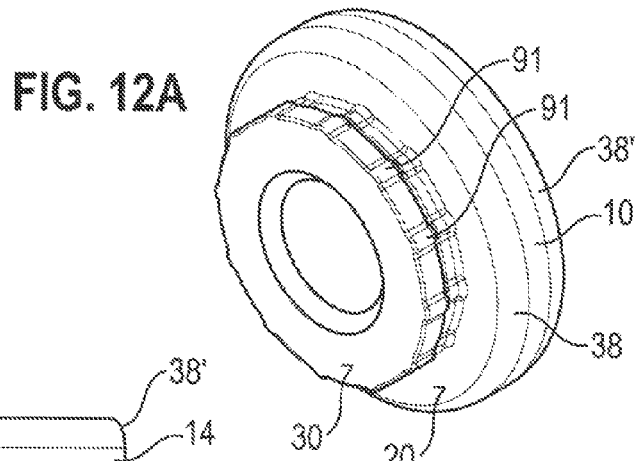

The FIGS. 10A and 10B then show the corresponding arrangement when using a recess. There the sheet metal contact surface 20 of the nut element 10 lies on the top side of the base surface of the sheet metal part 40 in FIG. 10A whereas it is evident from FIG. 10B, i.e. in the illustration on the lower side of the sheet metal part of FIG. 10A that the end face 30 of the nut element 10 does not project beyond the upper sheet metal side 68 of the sheet metal part in FIG. 10B.

In all embodiments the material of the sheet metal part is received in form-fitted manner in the groove 26. The reference numerals that are otherwise used are to be understood in the same way as previously, i.e. the previous description applies in just the same way for the features of shape which are characterized with the same reference numeral.

Whereas in the previous Figures the head part of the nut element 10 is polygonal in plan view, this is not compulsorily necessary, but rather the head part 14 can, for example, be circularly round in plan view as shown in FIGS. 11A, 11B, 12A and 12B, and indeed either with an embodiment of the piercing section and which both the peripheral surface of the piercing section and also the groove are polygonal and have rounded corners as well as with a piercing section which is itself circularly round in plan view and approximately circularly round, as shown in FIGS. 11A, 11B, 12A and 12B.

Figure 11A:
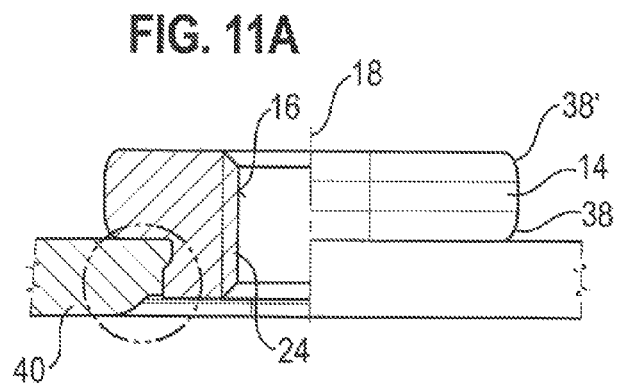
Figure 12B:
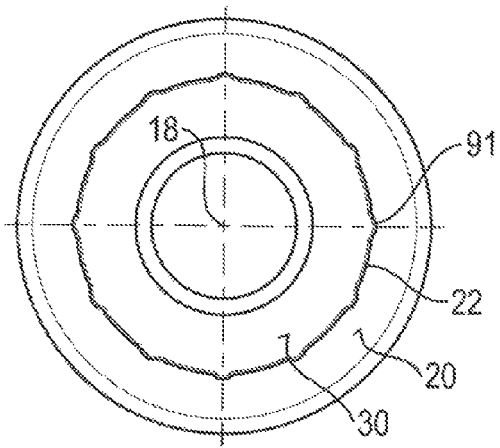
Figure 11B:
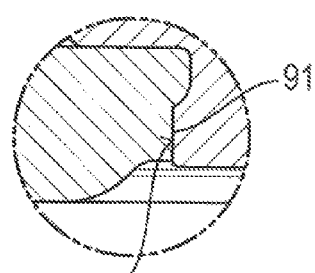
Figure 12C:
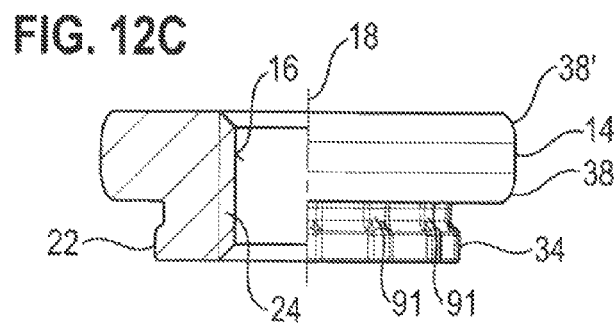

The FIGS. 11A and 11B show further how one can use a nut element 10 which is designed for a sheet metal thickness within certain limits which are determined by the stability of the piercing section in comparison of the sheet metal part thickness and strength also for a thicker sheet metal part by designing the piercing die button in the sense that the piercing die button is designed to form a pronounced recess in the lower side of the sheet metal part in FIGS. 11A and 11B respectively.

When the piercing section or the groove is made polygonal, the required security against rotation is achieved hereby by form-locked connection to the sheet metal part. If, however, the piercing section or the groove are circularly round it can be necessary to take other measures to ensure security against rotation. One possibility consists of providing the nut element in the region of the sheet metal contact surface 20 and of the groove 26 with an adhesive, for example an adhesive which cures under pressure.

Another possibility, which is shown in FIGS. 11a, 11B, 12A and 12B, consists in providing noses 90 providing security against rotation which have the form of ribs extending in the axial direction at the piercing section 22 which can be arranged at the cylindrical section 34 and in the groove 26.

When the nut element is provided with noses providing security against rotation which have the form of ribs at the piercing section which extend in the axial direction and which are arranged at the peripheral surface and/or in the groove then recesses 92 providing security against rotation are formed in the finished component assembly corresponding to the shape of the ribs providing security against rotation in the hole rim of the sheet metal part.

Figure 13A:
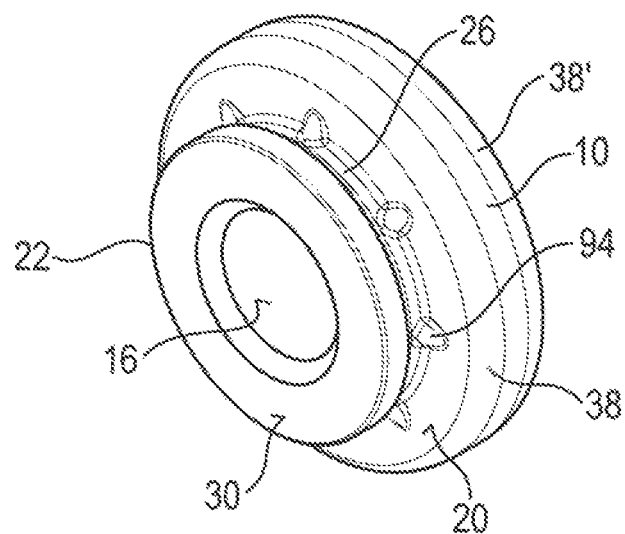
Figure 13B:
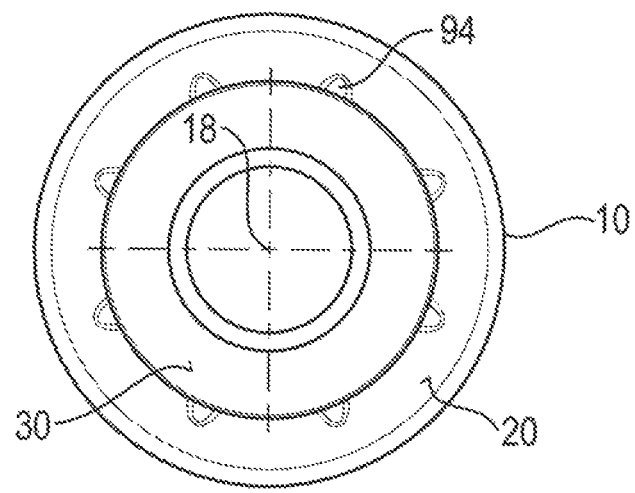
Figure 13C:
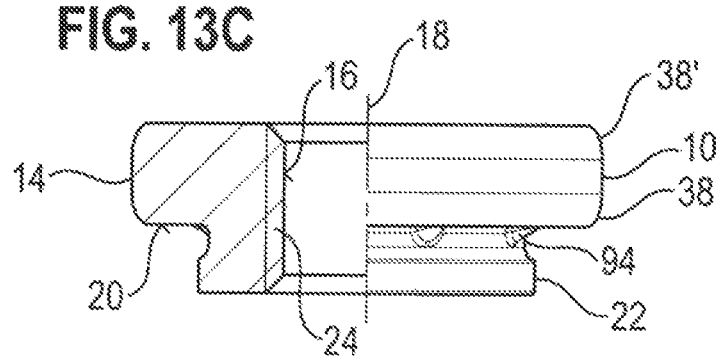

As an alternative to this, radially extending ribs 94 can be provided inside the groove as shown in FIGS. 13A to 13C, which are at least substantially triangular in side view.

When the nut element is provided with noses 94 providing security against rotation which have the form of ribs extending radially within the groove and which are at least substantially triangular in side view then the finished component assembly has recesses providing security against rotation in the hole rim of the sheet metal part corresponding to the shape of the ribs providing security against rotation.

The result of the attachment of the nut element 10 in accordance with the present teaching is a component assembly consisting of a self-piercing nut element 10 and a sheet metal part 40 and is characterized in that the sheet metal part 40 has a pierced hole with a shape corresponding to the shape of the piercing section 22, that the material of the sheet metal part 40 has at the side of the sheet metal part remote from the sheet metal contact surface 20 and adjacent to the piercing section a recess 62 which surrounds the piercing section and that the material of the hole rim is urged as a result of the design of the recess into the groove 26.

It is particularly favorable when the sheet metal part 40 lies in one plane in the region of the attachment of the nut element and also radially outside of this region and the free end face 30 of the piercing section 22 is set back from the side remote from the sheet metal contact surface.

At this point certain remarks are appropriate. The piercing section 22 or the groove 26 can have a shape in plan view which is selected from the group square, rectangular, pentagonal or hexagonal.

The peripheral surface 34 can have either an axially parallel extent or an enclosed angle relative to the longitudinal axis of greater than 0° to 5° in any desired radial planes which include the longitudinal axis 18, with the peripheral surface 34 of the groove 26 having a diverging extent towards the piercing edge 28.

The transition from the peripheral surface 34 to the groove 26 is either rounded or has the shape of an inclined surface with an included angle in the region between 30° and 75° related to the central longitudinal axis 18 and going in the direction of the piercing section 22 to the head part 14.

In all embodiments all materials can be named as examples for the material of the fastener elements which achieve the strength values of class 8 in accordance with the ISO standard and the contacting cold deformation, for example a 35B2-alloy in accordance with DIN 1654.

The invention claimed is:

1. A component assembly comprising a self-piercing nut element (10) and a sheet metal part (40) having a thickness, wherein the self-piercing nut element (10) has a strength in the range between 700 and 1250 MPa, and is designed to be pressed into said sheet metal part (40) having a thickness, the nut element having the following features: a head part (14) forming a flange (12), a central bore (16) in the head part having a thread with a nominal diameter which is designed to receive a bolt element and which has a central longitudinal axis (18), a sheet metal contact surface (20) formed in a plane at least substantially perpendicular to the central longitudinal axis at the flange (12), as well as a piercing section (22) extending away from the head part at the side of the sheet metal contact surface in the direction of the longitudinal axis, the nut being adapted for a self-piercing attachment of the nut element to said sheet metal part (40) having a strength greater than that of the nut element, wherein the sheet metal part has a strength greater than 900 MPa, the piercing section (22) has a peripherally extending radial groove (26) in the piercing section of the side of said plane remote from the sheet metal contact surface (20), the groove having a boundary spaced from the sheet metal contact surface, and the piercing section (22) further having a free end face and a piercing edge (28) at the free end face, with the piercing edge (28) being spaced from the boundary of the groove (26) by a peripheral surface (34) having an axial height which corresponds to at least 30% of the thickness of the sheet metal part, wherein the piercing section has a radial wall thickness in a region of its free end face from the outer side of the piercing section up to a nominal diameter of the thread, the radial wall thickness corresponding to a thickness between 1.2 to 1.8 times the thickness of the sheet metal part, and wherein said sheet metal part (40) has a pierced hole having a shape corresponding to the shape of the piercing section (22); wherein the material of said sheet metal part (40) at the side (68) of the sheet metal part remote from the sheet metal contact surface (20) has a recess (62) adjacent to the piercing section and surrounding the piercing section (22) and wherein the material of the hole rim is displaced into the groove (26) as a result of the formation of the recess (62).

2. The component assembly in accordance with claim 1, wherein said sheet metal part (40) lies in a plane (E) in the region of the attachment of the nut element (10) and also radially outside of this region and wherein the free end face (30) of the piercing section (22) is set back from the side remote from the sheet metal contact surface (20).

3. The component assembly in accordance with claim 2, wherein said sheet metal part (40) lies in the plane (E) in the region of the attachment of the nut element (10) and also radially outside of this region wherein the free end face (30) of the piercing section (22) is set back from the side remote from the sheet metal contact surface (20).

4. The component assembly in accordance with claim 1, wherein said sheet metal part (40) is provided with a recess (70), wherein the side of said sheet metal part (40) remote from the sheet metal contact surface (20) lies directly outside of a depression in a plane (E) and wherein the free end face (30) of the piercing section (22) projects within the recess (70) in front of the side (76) of said sheet metal part (40) remote from the sheet metal contact surface, but is offset rearwardly from the said plane (E).

5. The component assembly in accordance with claim 1, wherein when the nut element (10) is provided with noses (90) providing security against rotation which have the shape of ribs extending in the axial direction at the piercing section (22) which are arranged at the peripheral surface (34) and/or in the groove (26), recesses (92) providing security against rotation corresponding to the shape of the ribs providing security against rotation being formed in the hole edge of said sheet metal part (40) in accordance with the shape of the ribs providing security against rotation.

6. The component assembly in accordance with claim 1, wherein when the nut element (10) is provided with noses providing security against rotation which have the form of ribs (94) extending radially within the groove (26) and which are at least substantially triangular in side view, recesses providing security against rotation being formed in the hole rim of said sheet metal part (40) in accordance with the shape of the ribs providing security against rotation.

7. The component assembly in accordance with claim 1, wherein the self-piercing nut element (10) has a strength in the range between 700 and 900 MPa.

8. The component assembly in accordance with claim 1, wherein the sheet metal part has a strength greater than 1600 MPa.

\* \* \* \* \*